US010883457B2

(12) United States Patent
Villeneuve et al.

(10) Patent No.: US 10,883,457 B2
(45) Date of Patent: Jan. 5, 2021

(54) ENGINE COMPARTMENT HEATING ASSEMBLY

(71) Applicant: PRATT & WHITNEY CANADA CORP., Longueuil (CA)

(72) Inventors: Bruno Villeneuve, Boucherville (CA); Jean Thomassin, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 15/496,446

(22) Filed: Apr. 25, 2017

(65) Prior Publication Data

US 2018/0306147 A1 Oct. 25, 2018

(51) Int. Cl.
*F02M 35/10* (2006.01)
*F02B 37/16* (2006.01)
(Continued)

(52) U.S. Cl.
CPC ....... *F02M 35/10268* (2013.01); *B64D 33/02* (2013.01); *B64D 33/10* (2013.01);
(Continued)

(58) Field of Classification Search
CPC ....... F02M 35/10268; F02M 35/10157; F02M 35/10255; F02M 31/10; F02M 31/042;
(Continued)

(56) References Cited

U.S. PATENT DOCUMENTS

| 4,924,826 A | 5/1990 | Vinson |
| 8,826,893 B2 | 9/2014 | Marsh et al. |

(Continued)

FOREIGN PATENT DOCUMENTS

| EP | 3059419 A1 | 8/2016 |
| EP | 3109167 A1 | 12/2016 |

OTHER PUBLICATIONS

FAA-H-8083-32, Aviation Maintenance Technician Handbook-Powerplant, 2012, Federal Aviation Administration, vol. 1 and vol. 2, pp. 1-4, 3-2, 3-12, 6-16.*

(Continued)

*Primary Examiner* — Audrey K Bradley
*Assistant Examiner* — Edward Bushard
(74) *Attorney, Agent, or Firm* — Norton Rose Fulbright Canada LLP

(57) ABSTRACT

An engine assembly including an internal combustion engine configured to be received in an engine compartment and a heat exchanger having a first conduit fluidly connected to a fluid circuitry of the engine and a second conduit fluidly connecting an interior of the engine compartment to its environment. The first conduit is in heat exchange relationship with the second conduit. The assembly further includes a forced air system operable in use to provide an air flow from the environment to the outlet via the second conduit of the heat exchanger and the engine compartment. The assembly further includes a selector valve configurable to selectively fluidly connect an air intake of the internal combustion engine with the interior of the engine compartment in a first valve position and with the environment in a second valve position. A method for supplying air to an internal combustion engine is also discussed.

20 Claims, 4 Drawing Sheets

(51) Int. Cl.
*F02C 7/14* (2006.01)
*F02C 7/057* (2006.01)
*B64D 33/10* (2006.01)
*B64D 33/02* (2006.01)
*F01P 3/20* (2006.01)
*F01C 1/00* (2006.01)
*F02C 6/12* (2006.01)
*F01P 1/00* (2006.01)
*F01P 3/18* (2006.01)
*F01P 7/04* (2006.01)
*F01P 5/02* (2006.01)
*F02B 33/40* (2006.01)

(52) U.S. Cl.
CPC .................. *F01C 1/00* (2013.01); *F01P 3/20* (2013.01); *F02B 37/16* (2013.01); *F02C 6/12* (2013.01); *F02C 7/057* (2013.01); *F02C 7/14* (2013.01); *F02M 35/10013* (2013.01); *F02M 35/10157* (2013.01); *F02M 35/10255* (2013.01); *F01P 3/18* (2013.01); *F01P 5/02* (2013.01); *F01P 7/04* (2013.01); *F01P 2001/005* (2013.01); *F01P 2060/02* (2013.01); *F01P 2060/04* (2013.01); *F02B 33/40* (2013.01); *F05D 2260/213* (2013.01); *Y02T 10/12* (2013.01); *Y02T 50/60* (2013.01)

(58) Field of Classification Search
CPC ............ F02M 35/088; F02M 35/10013; F02B 37/16; F02B 29/0406; F02B 41/10; F02B 57/00; F02B 37/105; F02B 33/40; F23L 15/00; F02C 6/12; F02C 7/057; F02C 7/14; F01C 1/00; F05D 2260/213; F01P 3/20; F01P 2060/02; F01P 5/02; F01P 7/04; F01P 2060/04; F01P 3/18; F01P 2001/005; Y02T 50/676; Y02T 10/144; B64D 29/02; B64D 2033/028; B64D 33/02; B64D 33/10
USPC .......................................................... 60/599
See application file for complete search history.

(56) References Cited

U.S. PATENT DOCUMENTS 9,303,549 B2    4/2016    Chellan et al.
9,879,591 B2 *   1/2018    Thomassin ............. F02B 33/40
2014/0360445 A1   12/2014   Reynolds

OTHER PUBLICATIONS

Teos Powertrain Engineering, Jet A-1 aircraft engine, Structure—H 120, http://www.teos-engineering.com/experience/jet-a1-aircraft-engine/, Nov. 10, 2015.

* cited by examiner

US 10,883,457 B2

ENGINE COMPARTMENT HEATING ASSEMBLY

TECHNICAL FIELD

The application relates generally to internal combustion engines and, more particularly, to systems and methods used to feed air to such engines.

BACKGROUND OF THE ART

Internal combustion engines require air for the combustion process. The efficiency of the engines may be affected by the intake air temperature. In heavy icing environment, the air is at very low temperatures and may also include ice particles and/or supercooled water droplets which may produce an ice coating on engine components.

In some circumstances, it is required to pre-heat the air before it enters the internal combustion engine. However, the cost of such process may globally negatively impact performances of the engine.

SUMMARY

In one aspect, there is provided an engine assembly, comprising: an internal combustion engine configured to be received in an engine compartment having an outlet; a heat exchanger having a first conduit fluidly connected to a fluid circuitry of the internal combustion engine and a second conduit fluidly connecting an interior of the engine compartment to an environment of the compartment, the first conduit being in heat exchange relationship with the second conduit; a forced air system operable in use to provide an air flow from the environment to the outlet via the second conduit of the heat exchanger and the engine compartment; and a selector valve configurable to selectively fluidly connect an air intake of the internal combustion engine with the interior of the engine compartment in a first valve position and with the environment in a second valve position.

In another aspect, there is provided an engine assembly comprising an engine compartment having an inlet and an outlet and an internal combustion engine received in the engine compartment, the engine compartment fluidly connected to an environment thereof through the inlet, the engine assembly further including a heat exchanger extending over the inlet and defining a portion of a wall of the engine compartment, the heat exchanger having a first conduit fluidly connected to a fluid circuitry of the internal combustion engine and a second conduit fluidly connected to the environment via the inlet and fluidly connected to an interior of the engine compartment, the first and second conduits being in heat exchange relationship with each other, the engine assembly including a forced air system operable in use to provide an air flow from the environment to the outlet via the second conduit and the engine compartment, the engine assembly having a selector valve configurable to selectively fluidly connect an air intake of the internal combustion engine with the engine compartment in a first valve position and with the environment in a second valve position.

In a further aspect, there is provided a method for supplying air to an internal combustion engine received in an engine compartment, the method comprising: drawing outside air in the engine compartment through an inlet defined in walls of the engine compartment; heating the outside air while entering the engine compartment through the inlet such that air in the engine compartment is warmer than the outside air, the air being heated by cooling a fluid of the internal combustion engine; and configuring a selector valve in a selected one of first and second valve positions to feed air to the internal combustion engine, the internal combustion engine being fed with the air in the engine compartment in the first valve position and being fed with the outside air in the second valve position.

DESCRIPTION OF THE DRAWINGS

Reference is now made to the accompanying figures in which.

DETAILED DESCRIPTION

Figure 1:
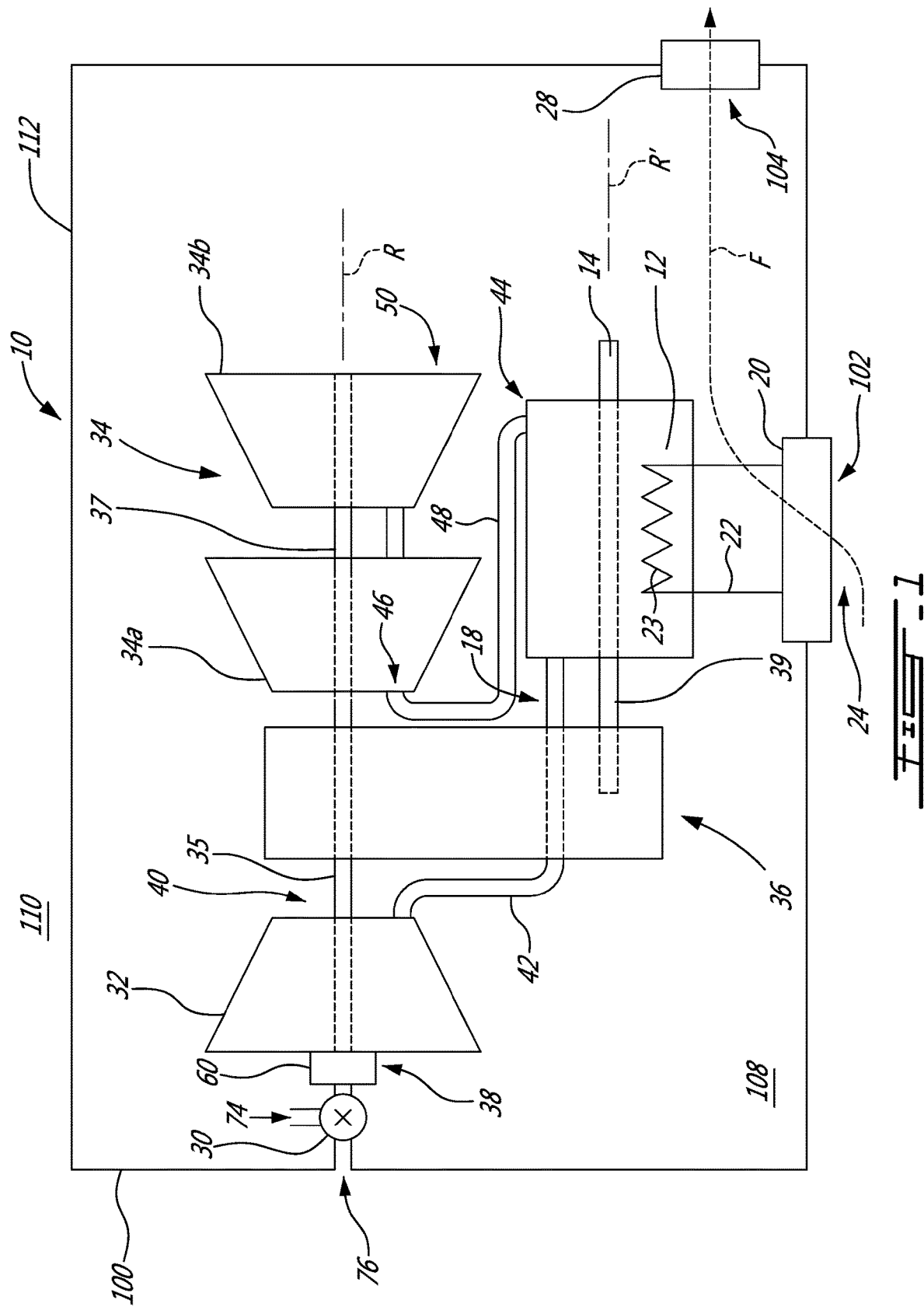
FIG. 1 is a schematic view of an engine assembly in accordance with a particular embodiment.

Referring to FIG. 1, an engine assembly 10 is generally shown and includes an internal combustion engine 12. In a particular embodiment, the internal combustion engine 12 comprises one or more rotary engines, for example Wankel engines, or one or more reciprocating pistons. The internal combustion engine 12 drives a shaft 14 that is used for driving a rotatable load (not shown). It is understood that the engine assembly 10 may alternately be configured to drive any other appropriate type of load, including, but not limited to, one or more generator(s), propeller(s), accessory(ies), rotor mast(s), compressor(s), or any other appropriate type of load or combination thereof.

In a particular embodiment, the engine assembly 10 a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The compound cycle engine system may be used as a prime mover engine, such as on an aircraft or other vehicle, or in any other suitable application.

The engine assembly 10 is disposed inside an engine compartment 100. In a particular embodiment, the engine compartment 100 is a nacelle, for fuselage or wing mounted engines, or a bay defined inside a vehicle (not shown) and adapted to receive the engine assembly 10. The engine compartment 100 has an inlet 102 and an outlet 104. The internal combustion engine 12 has an air intake 18 that may be selectively fluidly connected with a selected one of an interior 108 of the engine compartment 100 and an environment 110 outside thereof (e.g., to atmosphere). In the embodiment shown, the inlet 102 and the outlet 104 of the engine compartment 100 are in fluid communication with the environment 110.

The engine assembly 10 further comprises a heat exchanger 20 having one or more first conduit(s) 22 (one in the embodiment shown) fluidly connected to a fluid circuitry 23 of the internal combustion engine 12. The heat exchanger 20 further has one or more second conduit(s) 24 (one in the embodiment shown) fluidly connecting the interior 108 of the engine compartment 100 to the environment 110 through the inlet 102. In a particular embodiment, the first conduit 22 is configured to receive hot fluids, for example liquid coolant or lubricant (e.g. oil), of the internal combustion engine 12 and/or the engine assembly 10; multiple conduits could be provided, for example to independently receive a liquid coolant and a lubricant. The heat exchanger 20 is configured to provide heat exchange relationship between the hot fluid(s) circulating in the first conduit 22 and an airflow F circulating in the second conduit 24. In the embodiment shown, the heat exchanger 20 extends over the inlet 102 of the engine compartment 100 to define a portion of a wall 112 of the engine compartment 100.

The engine assembly 10 further includes a forced air system 28 operable in use to provide an air flow from the environment 110 to the outlet 104 via the second conduit 24 of the heat exchanger and the engine compartment 100, i.e., the flow F circulates from the environment 110 through the inlet 102, through the second conduit 24 of the heat exchanger 20, into the engine compartment 100, and out through the outlet 104. The airflow F passing in the second conduit 24 of the heat exchanger 20 picks up heat from the hot fluid(s) circulating through the first conduit 22 while entering in the engine compartment 100 such that the air of the engine compartment interior 108 is warmer than outside air in the environment 110.

In the embodiment shown, the forced air system 28 is disposed adjacent the outlet 104 of the engine compartment 100; the forced air system 28 is operable to expel air from the interior 108 of the engine compartment toward the environment 110. By doing so, a pressure differential occurs between the interior 108 and the environment 110 which causes the outside air of the environment to be drawn in the engine compartment through the inlet 102 and hence through the heat exchanger 20. Other configurations are also possible.

As mentioned earlier, the internal combustion engine 12 may receive either outside air from the environment 110 or warmer inside air from the engine compartment 100. For that purpose, the engine assembly 10 further has a selector valve 30 configurable to selectively fluidly connect the air intake 18 of the internal combustion engine 12 with a first assembly inlet 74 communicating with the interior 108 of the engine compartment 100 in a first valve position, and with a second assembly inlet 76 in fluid communication with the environment 110 independently of the compartment 100 in a second valve position. In a particular embodiment, the selector valve 30 also has an intermediate valve position where the valve fluidly connects the air intake 18 of the internal combustion engine 12 with both of the assembly inlets 74, 76 so the internal combustion engine 12 can receive a mix of air from the environment 110 and inside air from the engine compartment 100.

Therefore, a temperature of the air fed to the internal combustion engine 12 is variable in function of the operating conditions. For example, in a situation in which outside air is below a given threshold, the selector valve 30 allows to feed the internal combustion engine 12 with the air of the engine compartment 100 rather than, or in addition to, air from the environment 110. In warmer operating conditions, or in any occasion where cooler air is desirable, the air from the environment 110 may be fed to the internal combustion engine 10.

In the embodiment shown, the engine assembly 10 further includes a compressor 32 for compressing the air before it is fed to the intake of the internal combustion engine 12, and a turbine section 34 receiving the exhaust gases from the internal combustion engine 12. It is understood that variations are possible, and that, for example, the compressor 32 and/or turbine section 34 may be omitted.

In the illustrated embodiment, the internal combustion engine 12, the compressor 32, and the turbine section 34 are in driving engagement with a gearbox 36. The gear box 36 is configured to allow the turbine section 34 to compound power with the shaft 14 and to allow the turbine section 34 and/or the internal combustion engine 12 to drive the compressor 32.

In the illustrated embodiment, the compressor 32, the turbine section 34, and the gearbox 36 are serially disposed along a rotational axis R. A rotational axis R' of the internal combustion engine 12 is radially offset from the rotational axis R of the compressor 32 and of the turbine section 34. In the illustrated embodiment, shafts 35, 37, and 39 are used to connect the compressor 32, the turbine section 34, and the internal combustion engine 12 to the gearbox 36, respectively. Alternate configurations are possible, including, but not limited to, the compressor 32, turbine section 34, and internal combustion engine 12 disposed coaxially, or two or more of the shafts 35, 37, 39 extending at an angle (perpendicularly or otherwise) to each other.

In the depicted embodiment, the engine assembly 10 further comprises an intake plenum 60 having an outlet 62 (FIG. 4) fluidly connected to an inlet 38 of the compressor 32, while an outlet 40 of the compressor 32 is in fluid communication with the air intake 18 of the internal combustion engine 12, for example through a conduit 42.

The intake plenum 60 is in selective fluid communication with one or both of the assembly inlets 74, 76 through the selector valve 30, and is accordingly configured to receive air either from the interior 108 of the engine compartment 100 or from the environment 110, or from both. Therefore, the internal combustion engine 12 receives the pressurized air from the compressor 32, and the internal combustion engine 12 is in selective fluid communication with one or both of the assembly inlets 74, 76 through the compressor 32 and intake plenum 60.

The internal combustion engine 12 provides an exhaust flow of high pressure hot gas exiting at high peak velocity. In the case of a rotary engine, the exhaust flow is in the form of exhaust pulses. In the illustrated embodiment, an exhaust 44 of the internal combustion engine 12 (corresponding to or communicating with an exhaust port of a respective rotary engines/reciprocating pistons of the internal combustion engine 12) is in fluid communication with an inlet 46 of the turbine section 34 via a conduit 48. Accordingly, the exhaust flow from the internal combustion engine 12 is supplied to the turbine section 34. In the illustrated embodiment, the turbine section 34 comprises two turbine stages 34a and 34b in serial fluid communication. Other configurations are contemplated. The flow of exhaust gases exits an outlet 50 of the turbine section 34 and is expelled out of the engine compartment 100, for example to the environment 110.

Figure 2:
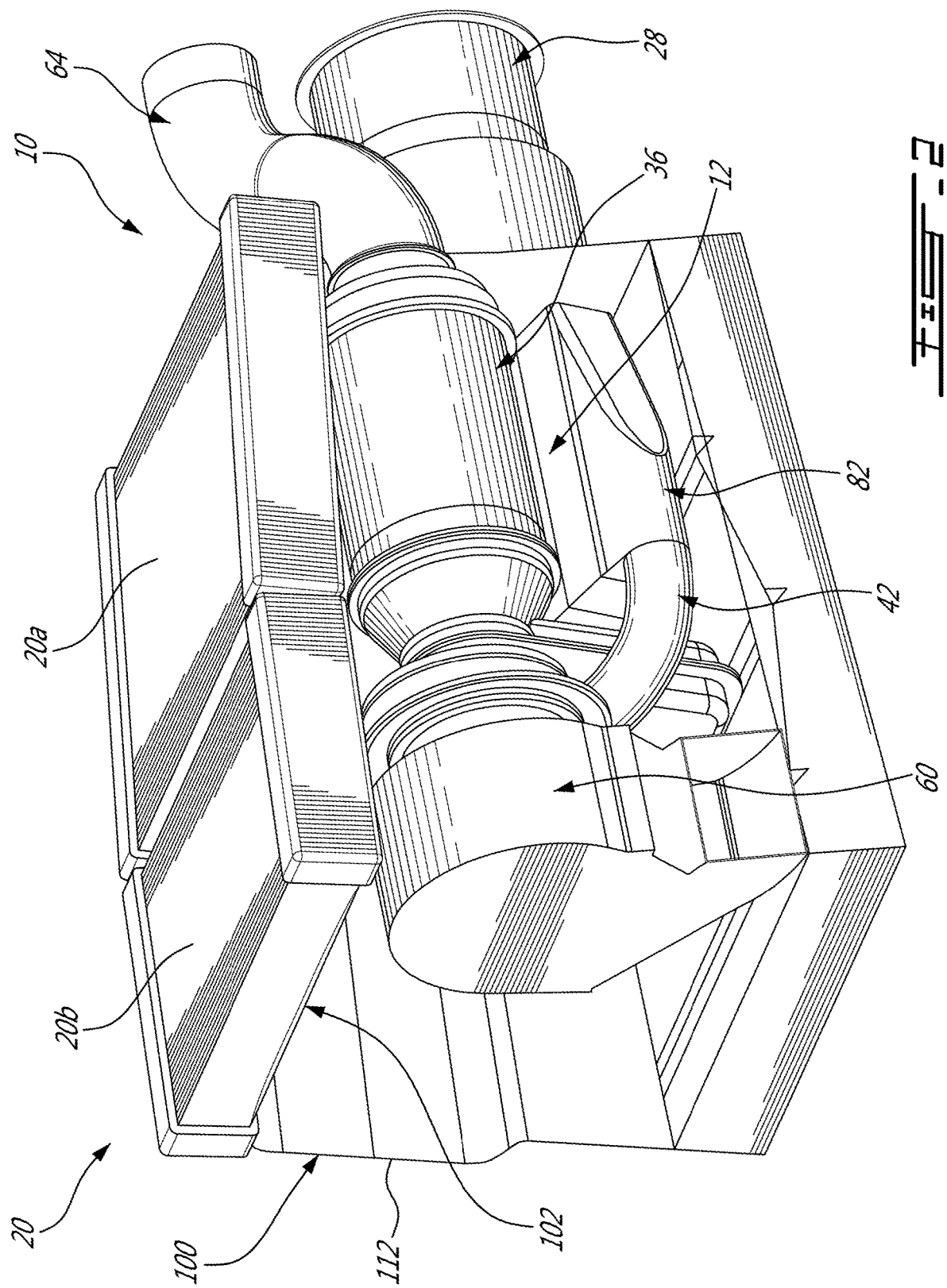
FIG. 2 is a schematic tridimensional view of an implementation of the engine assembly of FIG. 1, in accordance with a particular embodiment.
Figure 3:
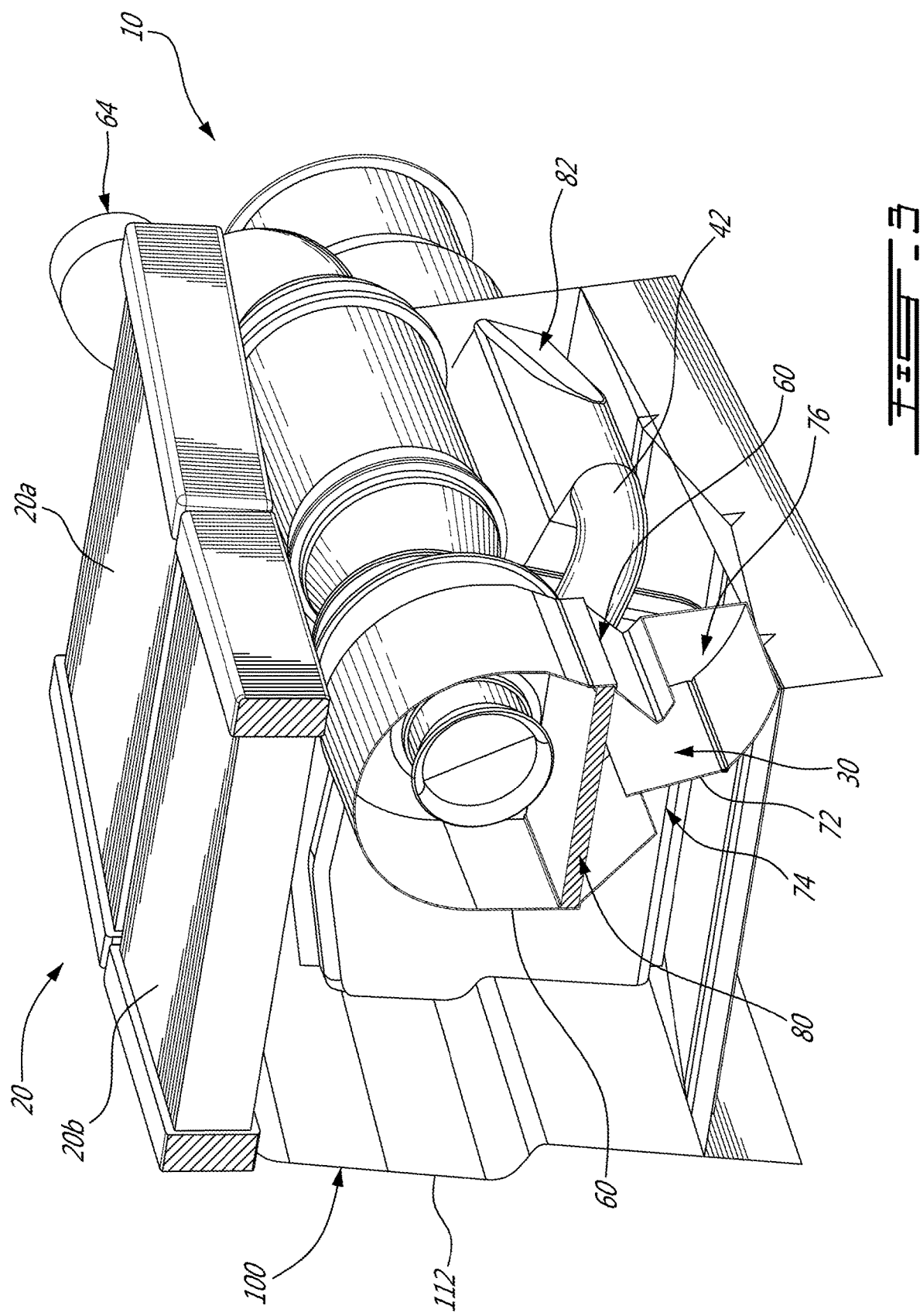
FIG. 3 is another schematic tridimensional view of the engine assembly of FIG. 2.
Figure 4:
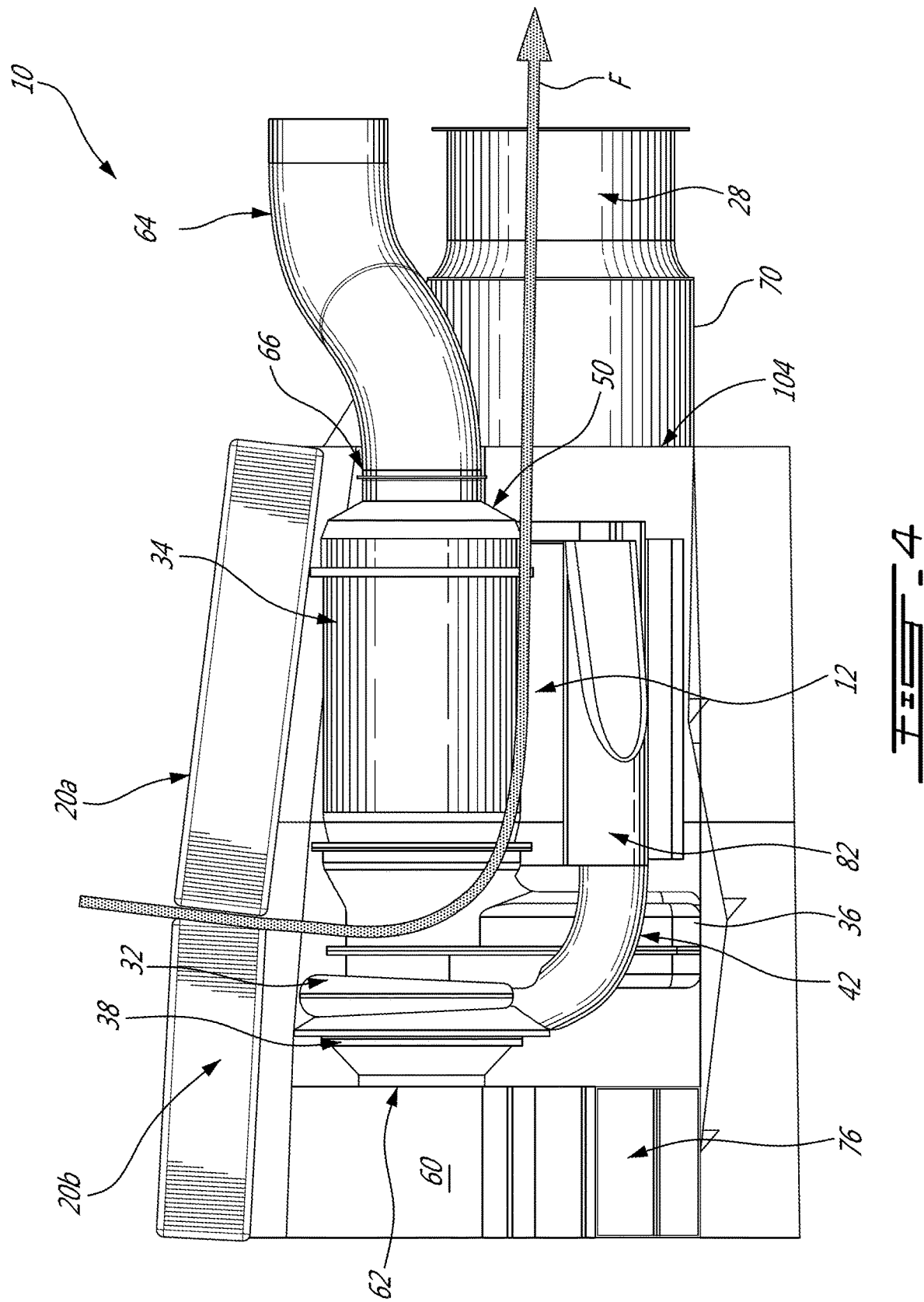
FIG. 4 is a schematic side view of the engine assembly of FIG. 2, with a side wall of the engine compartment removed for improved clarity.

FIGS. 2-4 illustrate an exemplary configuration for the engine 10 of FIG. 1; other configurations are contemplated. In the embodiment shown the walls 112 of the engine compartment 100 define the compartment inlet 102. The heat exchanger 20 covers the compartment inlet 102 such that at least a portion of a wall or an entirety of a wall of the engine compartment 100 is defined by the heat exchanger 20. For example, the engine compartment 100 is defined by walls extending from and connected around a perimeter of the heat exchanger 20, with the inlet side of the heat exchanger 20 being directly exposed to the environment, and the opposed outlet side of the heat exchanger 20 being directly exposed to the interior 108 of the compartment 100. The heat exchanger 20 is thus partly inside the compartment 100 and partly exposed to the environment 110. In the illustrated embodiment, the heat exchanger 20 comprises an oil cooler 20a and a liquid cooler 20b. The liquid cooler 20b is configured to cool a liquid coolant of the internal combustion engine 12.

In this embodiment, the engine assembly 10 further includes an air manifold 82 for distributing the air to the internal combustion engine 12. The air manifold 82 has an inlet fluidly connected to the compressor outlet 40 through the conduit 42. The air manifold 82 has an outlet fluidly connected with the air intake 18 of the internal combustion engine 12. In the embodiment shown, the air manifold 82 incorporates an intercooler, so as to cool the compressed air between the compressor 32 and the internal combustion engine 12. Other configurations are also possible.

In the illustrated embodiment, the engine assembly includes an exhaust conduit 64 having an inlet 66 fluidly connected to the outlet 50 of the turbine section 34. An outlet of the exhaust conduit 64 opens to the environment 110 to expel the exhaust gases in the environment 110.

In the embodiment shown, the forced air system 28 includes a fan disposed at an extremity of a conduit 70 fluidly connected with the engine compartment 100. The fan may be driven by a motor (not shown), for example an electric or hydraulic motor. Alternately, the fan may be driven by the internal combustion engine 12 and/or the turbine section 34. The fan may be a constant speed fan or a variable speed fan. It is understood that any other suitable type of forced air system, including, but not limited to ejector(s), pump(s), etc., may alternately be used.

As explained earlier, the forced air system 28 draws air in the engine compartment 100 through the heat exchanger 20 and out of the engine compartment 100 through the outlet 104 (FIG. 1). Although not shown, the exhaust from the turbine section 34 can be mixed with the cooling flow of the forced air system 28, for example in the conduit 70, either downstream or upstream of forced air system 28; in a particular embodiment where the forced air system 28 is a fan, the exhaust flow is mixed with the cooling flow downstream of the fan to avoid exposing the blades of the fan to the hot and dirty exhaust gases.

Referring more particularly to FIG. 3, in the embodiment shown the selector valve 30 is disposed in the intake plenum 60 and includes a door 72. The intake plenum 60 selectively communicates with the assembly inlet 74 in fluid communication with the interior 108 and the assembly inlet 76 in direct fluid communication with the environment 110, depending on the valve position as defined by the door 72. The door 72 is pivotable to selectively allow fluid communication between the intake plenum 60 and one or both of the assembly inlets 74, 76, for example to selectively allow fluid communication between the intake plenum 60 and one the assembly inlets 74, 76 while blocking fluid communication between the intake plenum 60 and the other one of the assembly inlets 74, 76. As previously mentioned, the outlet 62 of the intake plenum 60 is fluidly connected with the inlet 38 of the compressor 32. The internal combustion engine air intake 18 is fluidly connected with the intake plenum outlet 62 through the compressor 32.

It is understood that the configuration shown and described for the selector valve 30 is exemplary only and that any other suitable configuration may alternately be used.

In the illustrated embodiment, the intake plenum 60 includes an air filter 80 disposed therein. The air filter 80 is configured to remove impurity of the air before it is fed to the compressor 32 and internal combustion engine 12. The air filter 80 is positioned between the intake plenum outlet 62 and the assembly inlets 74, 76. The air filter 80 thus filters the air regardless of its origin (environment 110 and/or engine compartment 100). Other configurations are also possible; for example, a filter bypass could be provided so that the flow from the assembly inlets 74, 76 can circulate to the intake plenum outlet 62 without going through the filter 80, for use for example when the filter 80 is partially or completely blocked.

Referring to FIGS. 1-4, to supply air to the internal combustion engine 12 disposed in the engine compartment 100, outside air is drawn in the engine compartment 100 through the compartment inlet 102 defined in the walls 112. Then, the outside air is heated while entering the engine compartment 100 through the compartment inlet 102 such that air in the engine compartment is warmer than the outside air. In the illustrated embodiment, the engine compartment 100 is heated by cooling a fluid circulating of the internal combustion engine 12. As previously mentioned, the fluid may be, for example, oil or a liquid coolant of the engine 12. It is therefore possible to feed the internal combustion engine 12 with a selected one of the outside air of the environment 110 and the air in the engine compartment 100 in function of the operating conditions by configuring the selector valve 30 in a selected one of the first and second valve positions.

In the illustrated embodiment, the heating of the outside air is carried through the heat exchanger 20 disposed adjacent the compartment inlet 102. The heat exchanger provides heat exchange relationship between the fluid of the internal combustion engine 12 and the outside air circulating through the heat exchanger 20.

For selectively feeding the internal combustion engine 12, a position of a selector valve 30 is selected to allow fluid communication between the air intake 18 of the internal combustion engine 12 and the selected one of the environment 110 and the engine compartment 100. The selector valve 30 may also block fluid communication between the air intake 18 and the other one of the environment 110 and the engine compartment 100, or alternately allow fluid communication between the air intake 18 and both the environment 110 and engine compartment 100. In the illustrated embodiment, the position of the selector valve 30 allows fluid communication between the intake plenum 60 and one of the assembly inlets 74, 76 while blocking fluid communication between the intake plenum 60 and the other one of assembly inlets 74, 76. The valve 30 can also be positioned so that simultaneous communication of the intake plenum 60 with both inlets 74, 76 is allowed, so that a mixed flow from both sources can be provided to feed the internal combustion engine 12.

In the illustrated embodiment, the air of the engine compartment 100 and/or the air of the environment 110 is compressed by the compressor 32 before being directed to the air intake 18 of the engine 12. Alternately, the compressor 32 may be omitted.

In a particular embodiment, the position of the selector valve 30 varies in function of a temperature of the outside air. Accordingly, if the temperature of the outside air is below a threshold, the internal combustion engine 12 is fed with the air of the engine compartment 100. In a particular embodiment, the threshold about 32° F.; other values are also possible. In a particular embodiment, the position of the selector valve 30 varies in accordance with other parameters of the engine assembly 10; for example, so that the internal combustion engine 12 is fed at least in part with the air of the engine compartment 100 during cold start or relights temperatures different than below 32° F. In a particular embodiment, a controller (not shown) is used to control the position of the selector valve 30, based on the temperature of the outside air and other conditions related to icing probabilities, for example as determined by a suitable sensor, and/or based on other parameters of the engine assembly 10. Therefore, such a controller may comprise a temperature determining module and a selector valve controlling module. In the depicted embodiment, controlling the selector valve 30 comprises controlling movements of the pivotable door 72.

In a particular embodiment, the assembly 10 thus allows for a selection of a source of air for the engine 12 depending on operating conditions, while providing for a simple configuration taking advantage of "waste" heat generated by the heat exchanger 20 to selectively provide a source of heated air.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An engine assembly, comprising:
    an internal combustion engine drivingly engageable to a rotor for propulsion;
    an engine compartment, the internal combustion engine contained within an interior of the engine compartment, the engine compartment having:
        a first inlet fluidly connecting an environment outside the engine compartment to the interior of the engine compartment,
        a second inlet fluidly connecting the environment outside the engine compartment to the interior of the engine compartment, the first inlet and the second inlet being distinct and separated from one another, and
        an outlet fluidly connecting the interior of the engine compartment to the environment;
    a heat exchanger covering the second inlet of the engine compartment, the heat exchanger having a first conduit fluidly connected to a fluid circuitry of the internal combustion engine and a second conduit fluidly connecting the interior of the engine compartment to the environment outside of the compartment via the second inlet such that air from the environment enters the interior of the engine compartment via the second inlet through the heat exchanger, the first conduit being in heat exchange relationship with the second conduit;
    a fan operable in use to provide an air flow from the environment to the outlet via the second inlet and via the second conduit of the heat exchanger and via the engine compartment, the fan distinct from the rotor; and
    a selector valve configurable to selectively fluidly connect an air intake of the internal combustion engine with the interior of the engine compartment containing the internal combustion engine to feed the air intake with air that surrounds the internal combustion engine in a first valve position and with the environment via the first inlet in a second valve position, fluid communication between the environment and the interior of the engine compartment via the first inlet being limited by the selector valve when the selector valve is in the first valve position.

2. The engine assembly according to claim 1, wherein the selector valve is also configurable to simultaneously fluidly connect the air intake of the internal combustion engine with the interior of the engine compartment and the environment.

3. The engine assembly according to claim 1, further comprising an intake plenum located within the engine compartment, the intake plenum in fluid communication with the air intake of the internal combustion engine, the selector valve selectively fluidly connecting the intake plenum with the interior of the engine compartment in the first valve position and with the environment outside the engine compartment in the second valve position.

4. The engine assembly according to claim 1, wherein the fan is rotatable within a conduit fluidly connected to the engine compartment, the conduit secured to a wall of the engine compartment.

5. The engine assembly according to claim 1, wherein the internal combustion engine is a rotary engine, the rotary engine being liquid-cooled, the fluid circuitry flowing a liquid coolant of the rotary engine.

6. The engine assembly according to claim 1, further comprising a compressor having a compressor inlet selectively fluidly connected with the interior of the engine compartment in the first valve position and with the environment in the second valve position, and a compressor outlet fluidly connected to the air intake of the internal combustion engine.

7. The engine assembly according to claim 1, further comprising a turbine having a turbine inlet fluidly connected to an exhaust of the internal combustion engine, the turbine in driving engagement with the internal combustion engine.

8. The engine assembly according to claim 1, wherein the heat exchanger extends over an opening through a wall of the engine compartment such that the heat exchanger defines a portion of the wall of the engine compartment.

9. An engine assembly comprising:
    an engine compartment having
        a first inlet,
        a second inlet separate and distinct from the first inlet, and
        an outlet;
    an internal combustion engine drivingly engageable to a rotor for propulsion, the internal combustion engine received within an interior of the engine compartment, the interior of the engine compartment fluidly connected to an environment outside of the engine compartment through the first inlet and through the second inlet;
    a heat exchanger extending over the second inlet and defining a portion of a wall of the engine compartment, the heat exchanger having a first conduit fluidly connected to a fluid circuitry of the internal combustion engine and a second conduit fluidly connected to the environment via the second inlet and fluidly connected to the interior of the engine compartment such that air from the environment enters the interior of the engine compartment via the second inlet through the heat exchanger, the first and second conduits being in heat exchange relationship with each other;
    a fan operable in use to provide an air flow from the environment to the outlet via the second conduit and the engine compartment, the fan distinct from the rotor;

a selector valve configurable to selectively fluidly connect an air intake of the internal combustion engine with the interior of the engine compartment in a first valve position and with the environment via the first inlet in a second valve position.

10. The engine assembly according to claim 9, wherein the selector valve is also configurable to simultaneously fluidly connect the air intake of the internal combustion engine with the engine compartment and the environment.

11. The engine assembly according to claim 9, further comprising an intake plenum located within the engine compartment, the intake plenum in fluid communication with the air intake of the internal combustion engine, the selector valve fluidly connecting the intake plenum with the interior of the engine compartment in the first valve position and with the environment outside the engine compartment in the second valve position.

12. The engine assembly according to claim 9, wherein the internal combustion engine is a rotary engine, the rotary engine being liquid-cooled, the fluid circuitry flowing a liquid coolant of the rotary engine.

13. The engine assembly according to claim 9, further comprising a compressor having a compressor inlet selectively fluidly connected with the interior of the engine compartment in the first valve position and with the environment in the second valve position, and a compressor outlet fluidly connected to the air intake of the internal combustion engine.

14. The engine assembly according to claim 9, further comprising a turbine having a turbine inlet fluidly connected to an exhaust of the internal combustion engine, the turbine in driving engagement with the internal combustion engine.

15. A method for supplying air to an internal combustion engine received in an engine compartment, the method comprising:
  drawing outside air in the engine compartment through a first inlet defined in walls of the engine compartment with a fan in fluid communication with an outlet of the engine compartment, the fan being distinct than a rotor drivingly engaged to the internal combustion engine for propulsion;
  heating the drawn outside air while entering the engine compartment through the first inlet such that air in the engine compartment is warmer than the outside air, the air being heated by cooling a fluid of the internal combustion engine;
  in normal operating conditions, drawing the outside air in the engine compartment via a second inlet defined in walls of the engine compartment by configuring a selector valve in a first valve position and feeding the drawn outside air to an air intake of the internal combustion engine, the first and second inlets fluidly connecting an interior of the engine compartment to an environment outside the engine compartment, the first and second inlets being distinct and separated from one another; and
  in icing conditions, configuring the selector valve in a second valve position limiting fluid communication between the interior of the engine compartment and the environment via the second inlet and feeding the air intake of the internal combustion engine with the heated air located in the interior of the engine compartment.

16. The method of claim 15, wherein the heating of the drawn outside air comprises heating the drawn outside air through a heat exchanger disposed adjacent the heat exchanger inlet and providing heat exchange relationship between the fluid of the internal combustion engine and the outside air circulating through the heat exchanger.

17. The method of claim 15, wherein configuring the selector valve in the selected one of the first and second valve positions allows fluid communication between the air intake of the internal combustion engine and one of the environment around the engine compartment and the interior of the engine compartment, and blocks fluid communication between the air intake and the other one of the environment and the interior of the engine compartment.

18. The method of claim 15, wherein configuring the selector valve in the selected one of the first and second valve positions comprises allowing fluid communication between an intake plenum and one or both of a first inlet and a second inlet of the selector valve, the intake plenum having an outlet fluidly connected to the air intake of the internal combustion engine, the first inlet fluidly connected to the interior of the engine compartment, the second inlet fluidly connected to the environment around the engine compartment.

19. The method of claim 15, further comprising compressing the air before feeding the air to the internal combustion engine.

20. The method of claim 15, further comprising determining if a temperature of the outside air is below a threshold, and configuring the selector valve in the first valve position if the temperature is below the threshold.

* * * * *